United States Patent [19]

Sol

[11] Patent Number: 5,013,177

[45] Date of Patent: May 7, 1991

[54] CLAMP FOR FASTENING A PLATE TO A PIPE

[76] Inventor: Jean-Jacques Sol, 45 rue Raspail, Levallois Perret, France

[21] Appl. No.: 567,681

[22] Filed: Aug. 31, 1987

Related U.S. Application Data

[63] Continuation of Ser. No. 837,055, Mar. 6, 1986, abandoned.

[30] Foreign Application Priority Data

Mar. 6, 1985 [FR] France ................................ 85 03631

[51] Int. Cl.⁵ .............................................. F16B 7/04
[52] U.S. Cl. ...................................... 403/235; 403/374
[58] Field of Search ............. 403/104, 110, 241, 349, 403/192, 233–235, 374, 406.1

[56] References Cited

U.S. PATENT DOCUMENTS

| | | | |
|---|---|---|---|
| 1,935,310 | 11/1933 | Carlson | 403/235 |
| 2,417,654 | 3/1947 | LeVan | 403/235 |
| 3,084,964 | 4/1963 | Ruth | 403/235 |
| 3,423,781 | 1/1969 | Henson | 403/349 |
| 3,877,825 | 4/1975 | Roux | 403/233 |
| 4,493,579 | 1/1985 | Rauta Koura | 403/234 |
| 4,513,474 | 4/1985 | Watabe | 403/374 |

FOREIGN PATENT DOCUMENTS

| | | |
|---|---|---|
| 351728 | 3/1961 | Fed. Rep. of Germany . |
| 3106103 | 12/1982 | Fed. Rep. of Germany . |
| 1443271 | 5/1966 | France . |
| 2515017 | 4/1983 | France . |
| 646886 | 11/1950 | United Kingdom . |
| 1092546 | 11/1967 | United Kingdom . |

*Primary Examiner*—Peter M. Cuomo
*Attorney, Agent, or Firm*—Curtis, Morris & Safford

[57] ABSTRACT

A clamp for fastening a plate to a pipe or other upright in which the clamp includes a generally U-shaped stirrup member with its arms positioned on opposite sides of the upright and the end portions of the arms defining a slit for receiving the plate. A lever member is removably supported by the arms for pivotal movement with respect thereto and is arranged such that a single pivotal movement of the lever member is effective to secure both the plate and the upright to the clamp and thereby maintain the plate and the upright in fixed relationship with each other.

3 Claims, 1 Drawing Sheet

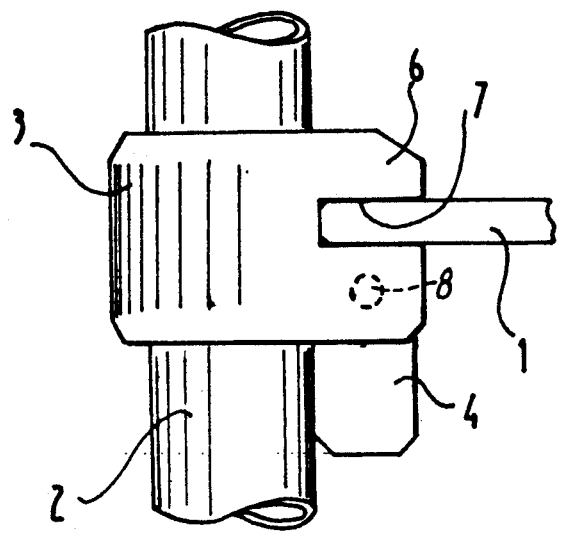
fig.1
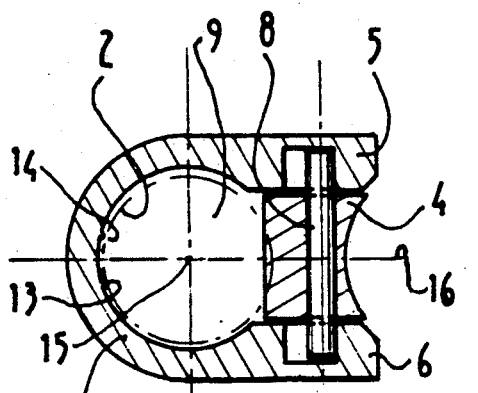
fig.5
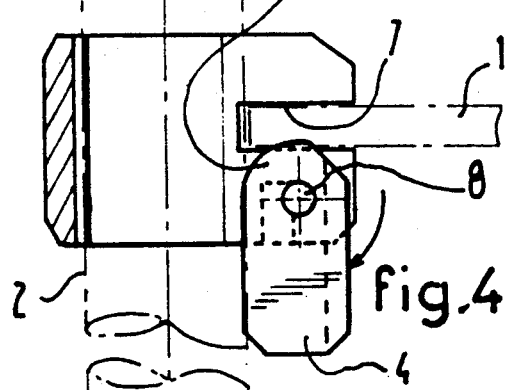
fig.4
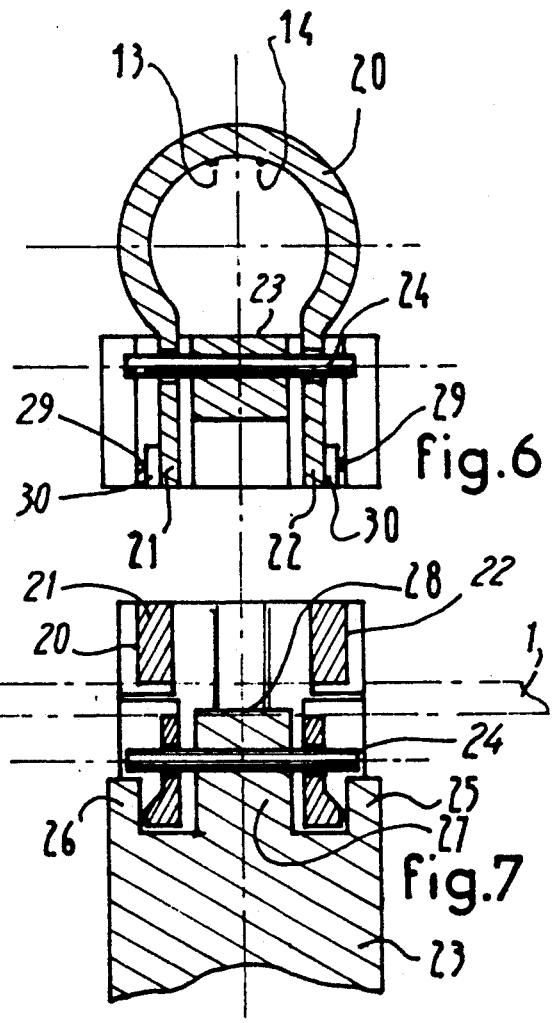
fig.6
fig.7
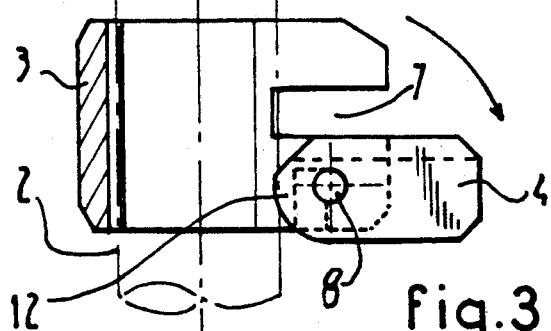
fig.3
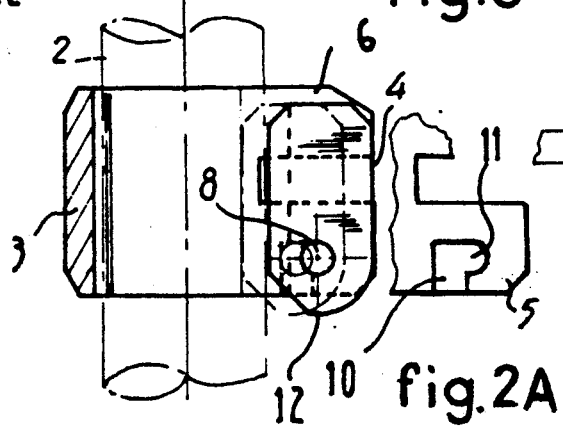
fig.2A
fig.2

CLAMP FOR FASTENING A PLATE TO A PIPE

This application is a continuation of application Ser. No. 837,055, filed Mar. 6, 1986, now abandoned.

BACKGROUND OF THE INVENTION

The present invention relates to clamps, and more particularly to clamps for assembling plane members such as plates or panels and elongated members such as pipes or other sections with a view to erecting structures, shelving or the like.

French Pat. No. 2,468,023 by the present inventor discloses a known device for the assembly of plates and sections. The device consists essentially of a small cylindrical piece comprising two axle-hollows for receiving the ends of cylindrical uprights and a slit at the side perpendicular to the axis of the cylinder for receiving the edge of a plate.

Such a device is quite suitable for erecting small structures, such as glass showcases, but it cannot readily be adapted to the fixing of plates onto existing tubular structures.

SUMMARY OF THE INVENTION

An object of the present invention is to provide a device which enables plates of substantially given thickness to be fixed accurately onto the tubular uprights of substantially given cross section. The uprights may form part of an existing structure produced by vertical and horizontal sections assembled by clamps known from prior art.

In accordance with the present invention the clamp is characterised in a general way in that it comprises a hollowed U-shaped stirrup, including a slit at the ends of its arms for receiving the said plate, lever member is hinged between the said arms of the stirrup to fix the plate with respect to the stirrup and the stirrup with respect to the upright.

The device is installed by mounting the stirrup round an upright such that, the upright occupies the hollow in the stirrup, then hinging the lever between the arms of the stirrup, the plate into the slit, and then pivoting the lever to fix the plate with respect to the upright.

In accordance with a first embodiment the fixing of the plate with respect to an upright results from the interference of the head of the lever in the spaces reserved on the one hand for the plate and on the other hand for the upright. This interference causes slight deformation, mainly on the portions of the clamp.

In accordance with a second embodiment the fixing of the plate with respect to the upright results on the one hand from the interference of the lever head in the space reserved for the plate and on the other hand from the pinching of the upright between the arms of the clamp. In this second embodiment there is deformation of the stirrup in the sense of reduction of the area for the upright to pass through.

In accordance with each of the aforesaid embodiments the hinging of the lever onto the arms of the stirrup is effected by a pivot pin extending beyond the lever and into open-sided bearings arranged in the arms. The pivoting of the lever fixes the plate in position by causing one end of the lever to enter the space inner to the slit.

Preferably each open-sided bearing is of L-shaped configuration. One of the arms of the L defines a passage for the introduction of the pivot pin, and the other arm defines a bearing cage.

The length and the thickness of the lever enable the simultaneous introduction firstly of the latter between the arms, and secondly of the pivot pins into the passages and then into the cages. The fixing of the plate and of the stirrup with respect to the upright results from pivoting the lever through 180°.

Preferably one of the longitudinal faces of the lever (that which before pivoting is in contact with the upright) is concave.

In accordance with the first embodiment the fixing of the stirrup with respect to the upright results from the lever encroaching upon the hollow in the stirrup.

In accordance with the second embodiment the fixing of the stirrup with respect to the upright results from the stirrup arms closing up. This results from the pressure exerted by two side fingers on the lever. In order to do this the lever has a trident shape including two side fingers and one central finger, the closing up of the arms of the stirrup resulting from the pressure exerted by the side fingers against the outer portions of the arms; preferably the pressure is exerted by means of inclined planes.

The present invention will be better understood and details belonging to it will become apparent from the description of preferred embodiments.

BRIEF DESCRIPTION OF THE DRAWINGS

FIG. 1 is a side elevation of an assembly and of its clamp according to a first embodiment of the invention;

FIG. 2 is a vertical sectional view of the clamp, together with a cooperating upright shown in phantom lines;

FIG. 2A is an enlarged fragmentary elevational view of a portion of the clamp of FIG. 2;

FIGS. 3 and 4 illustrate in section along the vertical axis of the upright and putting of the lever in place and its operation at different stages;

FIG. 5 illustrates in section through a plane perpendicular to the foregoing axis, the respective positions of the stirrup and of the lever in the clamping position of clamping the latter;

FIGS. 6 and 7 illustrate in section respectively along the plane perpendicular to the axis of the upright and along a plane parallel with the axis of the upright, a clamp in accordance with a second embodiment.

DETAILED DESCRIPTION OF THE PREFERRED EMBODIMENTS

In FIG. 1 there is represented the assembly of plate 1 on a tubular cylindrical upright 2 by means of an assembly device which includes a stirrup-shaped piece 3 and a lever 4. The lever 4 is hinged between the arms 5 and 6 (FIG. 5) of the stirrup-shaped piece whilst the plate is engaged in a slit 7 in these arms. The hinging of the lever 4 between the arms is effected by means of a pivot pin or spindle 8.

In order to locate the stirrup-shaped piece 3, initially deprived of the lever 4, the opening between its arms 5 and 6 is applied against the upright 2 and a pressure is exerted. The arms separate and then grip the upright 2 after the style of a clip. The stirrup 3 remains positioned on the upright more or less firmly.

As shown in FIG. 2, with the stirrup 3 in position on the upright 2 the lever 4 is placed between the arms 5 and 6 in parallel with the axis of the upright; each of these arms is provided with an inwardly facing open-sided bearing of L-shape comprising a passage 10 and a cage 11. The ends of the spindle 8 are inserted in the passages, and they seat in the cages. The lever 4 is provided with a concave surface 4' (FIG. 5) which conforms to the outer surface of the upright 2 when the lever is in its initial position.

The lever 3 is then pivoted through 90° to the position illustrated in FIG. 3. This movement brings a head 12 on the lever into the space reserved for the upright 2 and exerts pressure against the upright 2 situated in this space. The stirrup is thus fixed with respect to the upright and it may be observed that the slit 7 is freed.

As illustrated in FIG. 4, the plate 1 is introduced into the slit 7, and the lever is pivoted through another angle of 90°. In its new position the head 12 of the lever interferes slightly in the space in the slit 7 and consequently exerts a strong pressure against the plate 1. The lever causes pressure both against the upright 2 and against the plate 1; and the plate is now fixed in the slit in the stirrup and the stirrup is fixed with respect to the upright.

In order to remove the plate 1 it is sufficient to carry out the operations described above in reverse.

There may also be observed in FIG. 5 two ribs 13 and 14 parallel with the axis 15 of the cylindrical hollow in the stirrup, and arranged on opposite sides of the plane of symmetry 16 of the latter. These ribs enable deformation of the hollow in the stirrup, to prevent its rotation with respect to the upright, etc. . . .

In FIGS. 6 and 7 the device of the invention in accordance with the second embodiment comprises again a piece 20 of stirrup-shape. The stirrup 20 includes arms 21 and 22 between which as previously described is a lever 23 which may be seated and pivot about a spindle 24. As may better be seen in FIG. 7, the lever 23 has a trident shape including two side fingers 25 and 26 and one central finger 27. The central finger forms a head 28.

The introduction of the lever 23 between the arms 21 and 22 is effected as previously except that the spindle 24 is introduced axially through apertures in the arms and the lever. The fixing of the stirrup 20 with respect to the upright, however, does not result from the pressure exerted by the head 28 but from the tightening of the arms of the stirrup under the pressure of the fingers 25 and 26. This pressure of the fingers is exerted by way of bosses such as 29 and camming members such as 30 having inclined planar surfaces which engages the bosses 29.

In a modification of this embodiment the hinging of the lever 23 is effected by means of a spindle comparable with that of the spindle 8 in FIGS. 1-5. The spindle is introduced into L-shaped bearings having a passage and a cage.

The stirrup and the lever are advantageously produced by moulding from a plastic material having good mechanical characteristics, such as polycarbonate, ABS or polypropylene, whilst the spindle is of steel.

Although different embodiments have been described and represented, it must be understood that the present invention is not restricted to these forms but that it extends to any assembly device including the general characteristics set forth above.

I claim:

1. A clamp for the assembly of a plate to an upright, the clamp comprising, in combination:
   a generally U-shaped stirrup member defining an opening for the upright and having a pair of spaced arms adapted to be positioned on opposite sides of the upright, each arm having an inner and an outer surface, the arms including end portions defining a slit for receiving the plate and each of said arms having an open-sided bearing thereon;
   a pivot pin removably carried by the arms of the stirrup member and having each end thereof respectively disposed in one of the open-sided bearings and wherein each of said open-sided bearings defines an L-shaped recess for receiving the corresponding end of the pivot pin; and
   lever means mounted on the pivot pin to removably support the lever means on the arms of the stirrup member for a pivot movement with respect thereto and removably mountable between the inner surfaces of the arms, the lever means being pivotally movable between a first position, wherein the lever means is in a substantially horizontal position and bear directly against the upright and the plate may be slidably received within the slit, and a second position, wherein the lever means is in a substantially vertical position and generally perpendicular surfaces thereof bear directly against the plate inserted within the slit and the upright and has a head portion which enters said openings and said slit during said pivotal movement to secure both said plate and said upright to said clamp to maintain the plate and the upright in a fixed relationship, relative to one another.

2. A clamp for the assembly of a plate to an upright, the clamp comprising, in combination:
   a generally U-shaped stirrup member having a pair of spaced arms adapted to be positioned on opposite sides of the upright and each having inner and outer surfaces, the arms including end portions defining a slit for receiving the plate;
   lever means removably supported between the inner surfaces of the arms of the stirrup member for pivotal movement with respect thereto;
   operating means on said lever means for moving said arms toward each other during said pivotal movement to secure said upright to said clamp and wherein said operating means comprises two side fingers on said lever means which respectively cooperate with said arms; and
   said lever means being pivotally movable, between a first position, wherein the lever means is in a substantially horizontal position and bears directly against the upright and the plate may be slidably received within the slit, and a second position, wherein the lever means is in a substantially vertical position and generally perpendicular surfaces thereof bear directly against the plate inserted within the slit and the upright such that both the stirrup and base portion are mutually clamped, and the stirrup and plate portion are mutually clamped.

3. A clamp for the assembly of a plate to an upright, the clamp comprising, in combination:
   a generally U-shaped stirrup member having a pair of spaced arms adapted to be positioned on opposite sides of the upright and each having inner and outer surfaces, the arms including end portions defining a slit for receiving the plate;
   lever means removably supported between the inner surfaces of the arms of the stirrup member for pivotal movement with respect thereto;
   operating means on said lever means for moving said arms toward each other during said pivotal movement to secure said upright to said clamp, said operating means comprising two side fingers on said lever means which respectively cooperate with said arms; and said lever means being pivotally movable, between a first position, wherein the lever means is in a substantially horizontal position and bears directly against the upright and the plate may be slidably received within the slit, and a second position, wherein the lever means is in a substantially vertical position and generally perpendicular surfaces thereof bear directly against the plate inserted within the slit and the upright such that both the stirrup and base portion are mutually clamped, and teh stirrup and plate portion and mutually clamped, and wherein said lever means includes a central finger intermediate said side fingers and in a spaced relationship therewith.

* * * * *